UNITED STATES PATENT OFFICE.

GEORGE R. KING, OF NEW BRIGHTON, NEW YORK.

COMPOUND TO RESTRAIN THE SETTING OF PLASTER, &c.

SPECIFICATION forming part of Letters Patent No. 397,296, dated February 5, 1889.

Application filed September 17, 1888. Serial No. 285,634. (No specimens.)

*To all whom it may concern:*

Be it known that I, GEORGE R. KING, a citizen of the United States, and a resident of New Brighton, in the county of Richmond and State of New York, have made a new and useful Improvement in Compounds to Restrain the Setting of Plaster and the Like; and the following is a full, clear, and exact description of the same.

In the use of plaster-of-paris and other materials which have what is called a "quick set" it is very desirable to be able to restrain the setting action, so that a slow setting may be had, when desired, instead of the usual rapid setting of the material.

My invention consists in a composition of matter which will have the same restraining action when mixed with plaster or other materials which have a kindred setting action, and the quantity of my material that is used will govern the setting action of the plaster or like material with which it is mixed. Other materials may of course be mixed with the plaster—such as sand, lime, marble-dust, and a great variety of other substances—depending on the requirements of any special case.

I proceed for the production of my invention as follows: I take lime and slake it with water, thereby producing what is known as "hydrated lime." I then take this hydrated lime, dry it in any suitable manner, and grind or comminute it, preferably reducing it to a fine powder. I next dissolve any animal gelatinous or vegetable glutinous substance which possesses the quality of acting as a restrainer of plaster in water, warm or cold, as may be preferred. There are a number of these substances now well known, and they do not require enumeration here. Of them all, however, I prefer glue, because of a peculiarly beneficial result following its use arising from a toughening and strengthening action of hydrated lime upon glue, which renders the resulting wall material, whether a base-coat or a finish-coat, stronger and more durable than any other material of its class known to me. The restraining material, whatever it may be, (preferably glue,) as stated, I then thoroughly mix with the hydrated lime. More or less of the dissolved restraining material can be used, as desired. To make what I call a "stronger product," more of the restraining material is used. To make a less strong product, less of it is used. I have found that for ordinary purposes a mixture of, say, four pounds of glue may be dissolved in a pailful of water. This fluid mass will wet about a certain amount of powdered hydrated lime, (not much more or less,) so as to form a pasty mass. This pasty mass I then dry either by artificial or natural heat and in such form as preferred, and the result will be a dry cake or crust-like mass. Various drying methods may be used. I next powder or finely divide this dried material in whatever form it may have been dried by grinding or in any other suitable way, and when this is done my powdered compound, which I call a "restrainer," is ready for use as may be desired. For wall material it is added to any plaster or like material, with or without the admixture of other substances, in any desired quantity to restrain the setting action. Thus if my restrainer, for example, is added to common plaster-of-paris, even in such small quantities as to amount to one-quarter of a pound of the powdered restrainer to one hundred pounds of plaster, a restraining effect will be had, and by varying the proportions of restrainer I can regulate and control the time of setting as I may desire.

It is preferable in all cases to intimately mix the restrainer with the powdered plaster or equivalent substances while both are in the dry condition, and then add the water. This restrainer is very useful not only for admixture with the materials forming the base or brown coat for walls, but also in making a hard surface or finishing-coat for walls and the like, and it may also be advantageously used in the arts for numerous other purposes.

This powdered restrainer composed of hydrated lime and the restraining material is of about the same gravity as the material with which it is mixed for wall-covering, either brown coat or the finish-coat. Thus when these several materials are once well mixed in a powdered condition and placed in barrels for shipment they will remain in a combined state and will not injuriously separate during transportation or consequent on jar or shock.

Although I prefer that the hydrated lime should be dried and powdered before the mixing therewith of the dissolved restraining material, still I do not limit myself to this method, because I have found that I can produce a good restraining-powder by mixing the restraining material either in a powdered or divided form, or in a dissolved condition, with the hydrated lime while it is still in a plastic state, and then, of course, drying and powdering the lime containing the restraining material, as before.

Instead of grinding my restrainer at the time of its manufacture, it may be left in the form of dry cakes or masses, whereby it may be more easily transported to be pulverized at the time of use, because a package which will hold the cakes can be more easily and inexpensively obtained than one which will hold the powdered restrainer without waste.

What I claim, and desire to secure by Letters Patent, is—

1. The above-described composition of matter, composed, essentially, of animal gelatinous or vegetable glutinous matter and hydrated lime, substantially as set forth.

2. The above-described composition of matter, composed, essentially, of animal gelatinous or vegetable glutinous matter and hydrated lime combined and reduced to a finely-divided condition, substantially as set forth.

Signed at New Brighton, Richmond county, and State of New York, this 14th day of September, 1888.

GEO. R. KING.

Witnesses:
THOS. BALE,
W. H. BIGNELL.